(12) United States Patent
Jao et al.

(10) Patent No.: US 7,617,397 B2
(45) Date of Patent: Nov. 10, 2009

(54) SYSTEMS AND METHODS FOR GENERATION AND VALIDATION OF ISOGENY-BASED SIGNATURES

(75) Inventors: David Y. Jao, Bellevue, WA (US); Peter L. Montgomery, Bellevue, WA (US); Ramarathnam Venkatesan, Redmond, WA (US); Victor Boyko, Brooklyn, NY (US)

(73) Assignee: Microsoft Corporation, Redmond, WA (US)

( * ) Notice: Subject to any disclaimer, the term of this patent is extended or adjusted under 35 U.S.C. 154(b) by 944 days.

(21) Appl. No.: 11/119,405

(22) Filed: Apr. 29, 2005

(65) Prior Publication Data

US 2006/0248338 A1 Nov. 2, 2006

(51) Int. Cl.
*H04L 9/32* (2006.01)
(52) U.S. Cl. .......................... 713/176; 380/30
(58) Field of Classification Search ............... 380/30; 713/176; 708/492
See application file for complete search history.

(56) References Cited

U.S. PATENT DOCUMENTS

| | | | |
|---|---|---|---|
| 5,982,892 A | 11/1999 | Hicks et al. | |
| 6,910,058 B2 * | 6/2005 | Futa et al. | 708/491 |
| 7,010,694 B2 * | 3/2006 | Vatanen | 713/176 |
| 2002/0021803 A1 * | 2/2002 | Solinas | 380/30 |
| 2002/0122555 A1 | 9/2002 | Crandall | |
| 2003/0081771 A1 * | 5/2003 | Futa et al. | 380/30 |
| 2004/0098436 A1 * | 5/2004 | Futa et al. | 708/492 |

FOREIGN PATENT DOCUMENTS

EP 1528705 5/2005

OTHER PUBLICATIONS

Alexander Rostovtsev; Elliptic Curve Ordered Digital Signature; Apr. 8, 2004; St. Petersburg State Polytechnic University,Russia; p. 1-7.*
Akishita, et al., "On the Optimal parameter choice for elliptic curve cryptosystems using isogeny", IEICE Transactions on fundamentals of electronics, Communication and computer sciences, Engineering sciences society, vol. E88-A, No. 1, Jan. 2005, pp. 140-146.

* cited by examiner

*Primary Examiner*—Michael J Simitoski
*Assistant Examiner*—Monjour Rahim
(74) *Attorney, Agent, or Firm*—Lee & Hayes, PLLC

(57) ABSTRACT

Techniques are described for generating and validating signatures. In an implementation, a method includes generating a signature by utilizing a plurality of isogenies included on a private key and incorporating the signature and a public key on a product, in which the public key is configured to validate the signature.

18 Claims, 5 Drawing Sheets

US 7,617,397 B2

SYSTEMS AND METHODS FOR GENERATION AND VALIDATION OF ISOGENY-BASED SIGNATURES

TECHNICAL FIELD

The present invention generally relates to signatures and more particularly relates to isogeny-based signatures.

BACKGROUND

Counterfeiting and piracy of products is an ever increasing problem that affects not only the manufacturers of the products, but also consumers of the pirated products. For example, a copied product, such as a tool, may not have been manufactured to have quality that is equivalent to the product being copied. Therefore, the copied product may not be suitable for the purpose intended by the consumer. This may be further complicated when the consumer believes that the product is authentic, thereby giving the consumer a false impression of the quality of the manufacturer's goods. In another example, the product may be a copied version of software. However, because the software is not authentic, the software may be not be able to utilize all the functions which are available to authentic versions of the software, such as features which are included in the software itself, access to updates provided by the manufacturer for the software, and so on.

One technique which is utilized to limit product counterfeiting and piracy is the use of signatures. Signatures, for instance, may be generated utilizing a mathematical technique. To verify the signature, the signature is processed to identify whether a mathematical property is present in the signature. If so, the signature is generally considered valid. However, as the amount of computing resources available to consumers continues to increase, there is a corresponding need to develop improved techniques for generating and validating signatures such that the ever increasing availability of computer resources can not be utilized to "break" the signature.

SUMMARY

Techniques are described for generating and validating signatures. In an implementation, a method includes generating a signature by utilizing a plurality of isogenies included on a private key and incorporating the signature and a public key on a product, in which the public key is configured to validate the signature.

In another implementation, a method includes receiving a signature and validating the signature utilizing a public key having a plurality of results from applying a plurality of isogenies to a point on an elliptic curve.

In a further implementation, a computer-readable medium includes a signature, a public key having a plurality of images obtained by applying a plurality of isogenies to a point on an elliptic curve and one or more modules which are executable to validate the signature using the public key.

BRIEF DESCRIPTION OF THE DRAWINGS

The same reference numbers are utilized in instances in the discussion to reference like structures and components.

DETAILED DESCRIPTION

Overview

Techniques are described for generating and validating signatures. Signatures may be utilized for a variety of purposes, such as to authenticate the identity of a sender of a message, a signer of a document, and so on. For example, a signature may be configured as all or part of a product identifier (PID), also called a product ID. The product identifier may then be utilized to determine whether the corresponding product is "authentic". For example, a software developer may write computer-executable instructions (e.g., an application) to a computer-readable medium, such as a CD-ROM. The software developer may also include a PID which includes a signature generated utilizing a mathematical technique on the CD-ROM.

When a user desires to install the application on a computer, the installation process may involve checking to determine whether that software is authentic through use of the PID. For instance, the installation process may determine whether the PID, and more particularly the signature within the PID, exhibits the particular mathematical property. If so, the application is considered authentic and the installation process continues. If not, the installation process may be terminated to prevent installation of an unauthorized copy of the application. A wide variety of other techniques may also be utilized in conjunction with a signature, further discussion of which may be found in relation to the following figures.

In the following discussion, an exemplary environment is first described which may employ techniques for generation and validation of signatures. Exemplary procedures are then described which are operable in the exemplary environment, as well as in other environments.

Exemplary Environment

Figure 1:
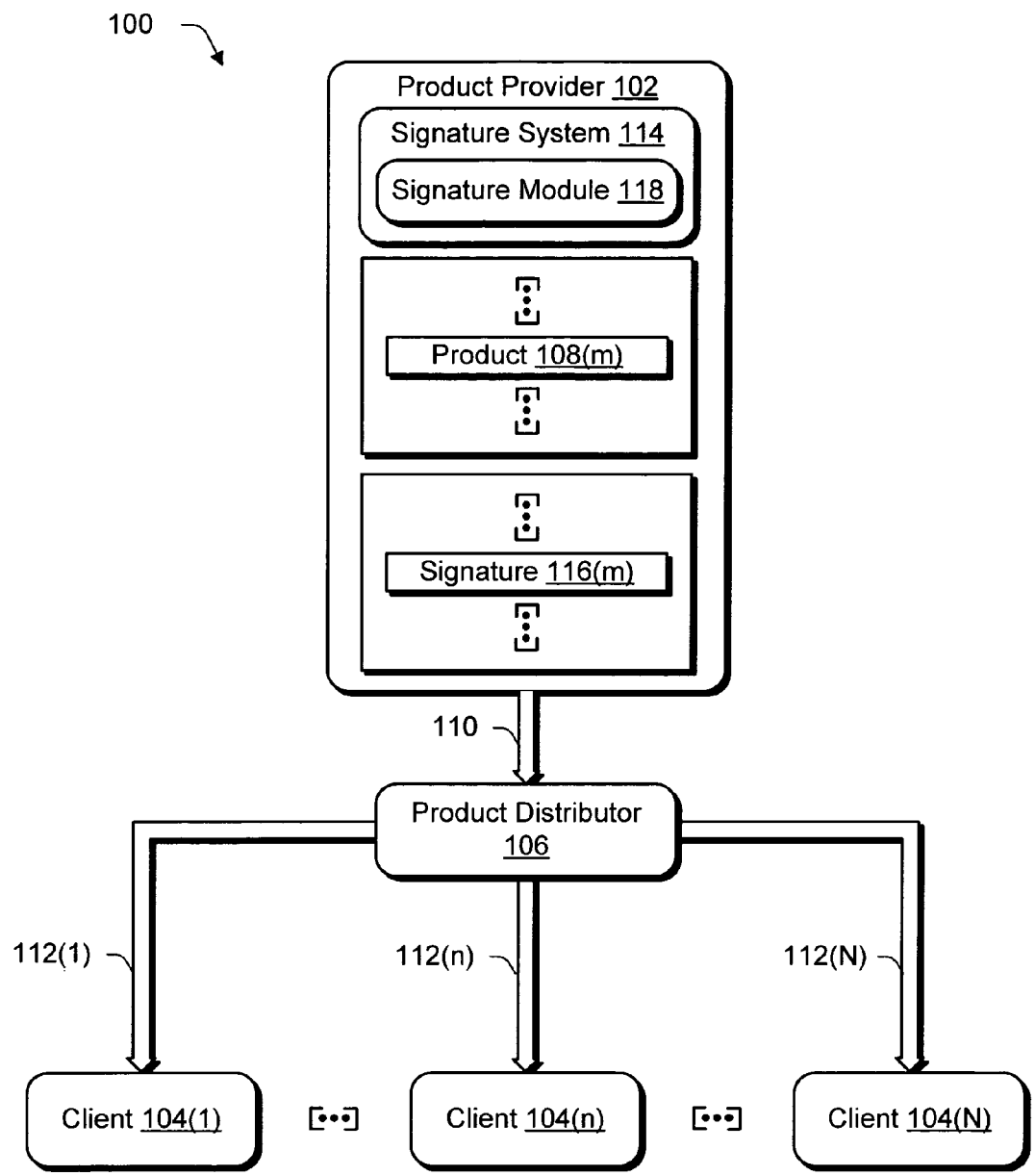
FIG. 1 is an illustration of an environment in an exemplary implementation which is operable to employ techniques for generation and validation of signatures.

FIG. 1 is an illustration of an environment 100 in an exemplary implementation that is operable to employ techniques for generation and validation of signatures. The illustrated environment 100 includes a product provider 102, a plurality of clients 104(1), . . . , 104(n), . . . , 104(N), and a product distributor 106. The product provider 102 is further illustrated as including a plurality of products 108(m), where "m" can be any integer from one to "M", for distribution to the plurality of clients 104(1)-104(N). The products 108(m) may be configured in a variety of ways. For example, one or more of the products 108(m) may be configured as a physical item (e.g., a manufactured good, computer-readable medium having computer-executable instructions), electronic content (e.g., a downloadable song, software, digital photo) and so forth.

The products 108(m) may then be delivered to a product distributor 106 via a delivery channel 110 for distribution. For example, the delivery channel 110 may represent physical delivery of the products 108(m) to the product distributor 106, such as a physical transfer from a manufacturing plant to a "bricks-and-mortar" store. In another example, the delivery channel 110 may be configured as a communication channel for electronic communication of the product 108(*m*), such as a network. The product distributor 106 may then distribute the products 108(*m*) to the plurality of clients 104(1), 104(*n*), 104(N) via respective distribution channels 112(1), 112(*n*), 112(N), which may be the same as or different from the distribution channel 110, e.g., physical, network, and so on.

As previously described, unauthorized copying of products is an ever increasing concern. Therefore, the product provider 102 may utilize a signature system 114 in order to generate a signature 116(*m*) for each of the plurality of products. In an implementation, each of the products 108(*m*) has a corresponding one of the plurality of signatures 116(*m*) that are distinct, one to another. A variety of other implementations are also contemplated, such as groupings of signatures for different product groups.

The signature system 114 is illustrated as including a signature module 118 which is executable to generate the signatures 116(*m*) and/or verify the signatures 116(*m*). For example, the signature module 118 may generate the signatures 116(*m*) such that each signature 116(*m*) will pass a test which may be utilized to determine whether the signature 116(*m*) is valid, and therefore not generated by a malicious party.

Verification of the signature 116(*m*) may be performed in a variety of ways. For example, each of the plurality of clients 104(1)-104(N) may be provided with techniques for determining whether the signature 116(*m*) is valid without communicating with the product provider 102. In this example, such verification is performable "offline" in that a communicative coupling with the product provider 102 is not needed. In another example, one or more of the clients 104(1)-104(N) may communicate the signature 116(*m*) to the product provider 102 such that the product provider 102 may determine whether the signature is valid. For instance, the client 104(*n*) may wish to receive a software update for a product 108(*m*) configured as an application. Therefore, the client 104(*n*) may communicate the corresponding signature 116(*m*)(e.g., via the Internet, telephone, and so on) to the product provider 102. The product provider 102 may then determine whether the client 104(*n*) has a "valid" (i.e., authentic) version of the application and is therefore permitted to receive the update. In a further example, the verification may be performed by another entity other than the product provider 102 or the clients 104(1)-104(N), such as a stand-alone verification service. Further discussion of generation and verification of the signature 116(*m*) may be found in relation to FIG. 2.

Generally, any of the functions described herein can be implemented using software, firmware (e.g., fixed-logic circuitry), manual processing, or a combination of these implementations. The terms "module," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the generation and validation techniques described below are platform-independent, meaning that the techniques may be implemented on a variety of commercial computing platforms having a variety of processors.

Figure 2:
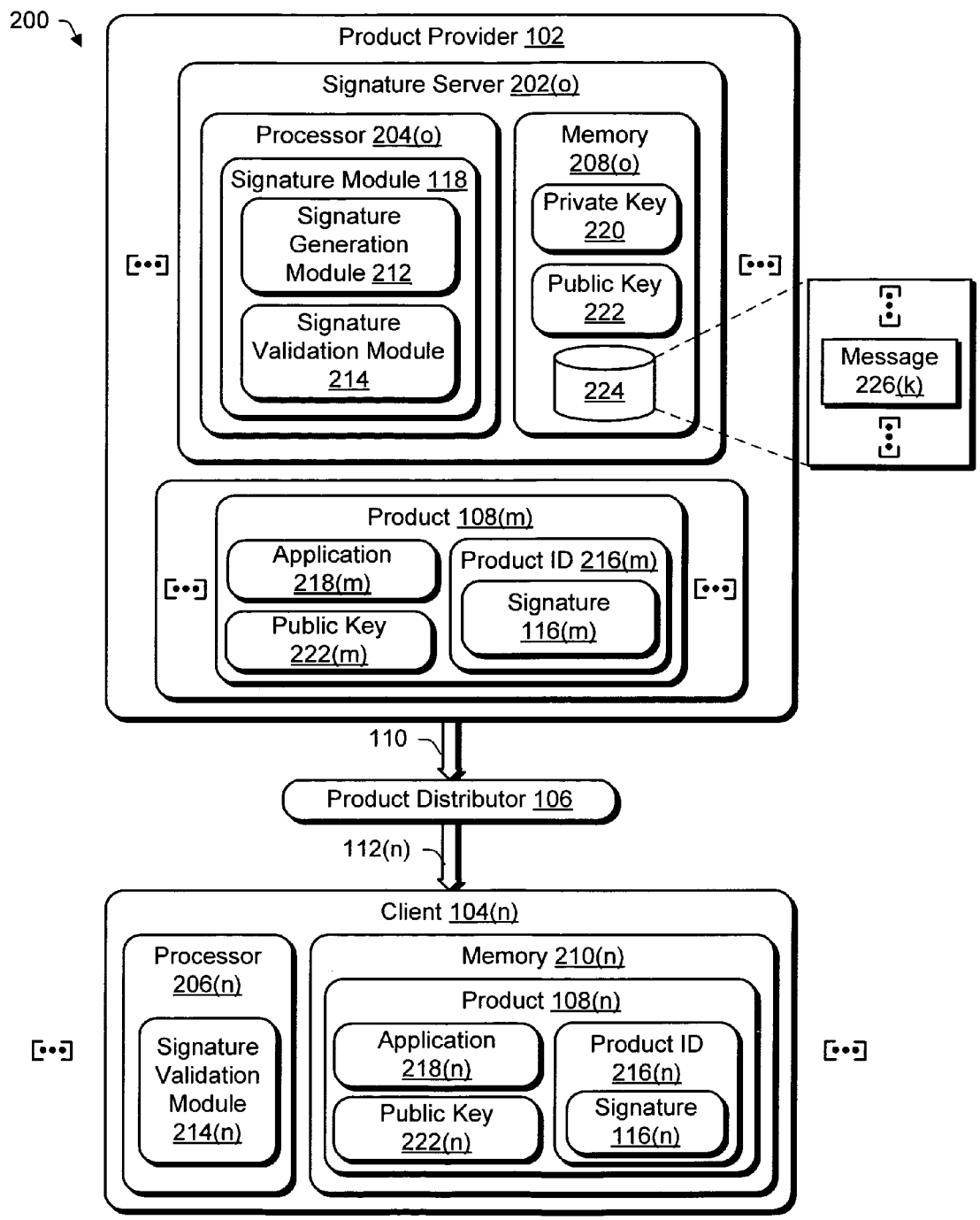
FIG. 2 is an illustration of a system in an exemplary implementation showing a product provider and a client of FIG. 1 in greater detail.

FIG. 2 is an illustration of a system 200 in an exemplary implementation showing the product provider 102 and the client 104(*n*) of FIG. 1 in greater detail. The product provider 102 is illustrated as including a plurality of signature servers 202(*s*) (where "*s*" can be any integer from one to "S") and the client 104(*n*) is illustrated as a client device. The client 104(*n*) may be configured as a variety of different devices. For example, the client 104(*n*) may be configured as a computing device, such as a desktop computer, a mobile station, an entertainment appliance, a set-top box communicatively coupled to a display device, a wireless phone, a game console, and so forth. Thus, the client 104(*n*) may range from a full resource device with substantial memory and processor resources (e.g., personal computers, game consoles) to low-resource devices with limited memory and/or processing resources (e.g., traditional set-top boxes, hand-held game consoles). For purposes of the following discussion, the client(s) 104(*n*) may also relate to a person and/or entity that operate the clients. In other words, the client 104(*n*) may also describe logical clients that include users, software, and/or devices.

The signature server 202(*s*) and the client 104(*n*) are illustrated as including a respective processor 204(*o*), 206(*n*) and a respective memory 208(*o*), 210(*n*). Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208(*o*), 210(*n*) is shown, respectively, for the signature server 202(*s*) and the client 104(*n*), a wide variety of types and combinations of memory may be employed, such as random access memory (RAM), hard disk memory, removable medium memory, and so forth.

The signature module 118 is illustrated as being executed on the processor 204(*o*) and is storable in memory 208(*o*). The signature module 118 is also illustrated as including a signature generation module 212 and a signature validation module 214. The signature generation module 212 is representative of functionality for generating signatures. The signature validation module 214 is representative of functionality for verifying the authenticity of signatures to determine whether the signatures were likely generated by the signature generation module 212 or an entity that has access to the proprietary technique for generating the signature, such as an authorized third party.

The signature generation module 212 is executable to generate the signature 116(*m*) which will pass a test applied by the signature validation module 214 which is used to determine whether the signature is 116(*m*) is valid, and therefore not generated by a malicious party. The signature 116(*m*) is illustrated as included in a product ID 216(*m*) which is included in a product 108(*m*) that is configured as a computer-readable medium. The product 108(*m*)(i.e., the computer-readable medium) is also illustrated as including an application 218(*m*)(which corresponds to the signature 116(*m*) and the product ID 216(*m*)) for distribution to the client 104(*n*). Therefore, the product 108(*m*) in this example may be considered the application 218(*m*) and/or the computer-readable medium which contains the application 218(*m*).

The product ID 216(*m*) is generally represented using letters and/or numbers. The product ID 216(*m*) may be configured such that an entity (e.g., the client 104(*n*) and/or the product provider 102) verifies the product ID 216(*m*) by converting the signature 116(*m*) into a sequence of numbers and applying a mathematical algorithm to determine whether that number, and consequently the signature $116(m)$, was generated by an entity (e.g., the signature system $114$ of FIG. $1$) that had access to the technique that was utilized to generate the signature $116(m)$.

A variety of techniques may be utilized to generate the signature $116(m)$. For example, the signature server $202(s)$ is illustrated as including a private key $220$, a public key $222$, and a database $224$ of messages $226(k)$ (where "k" can be any integer from one to "K") that are stored in memory $208(o)$. The signature generation module $212$ is executable to process the plurality of messages $226(k)$ using the private key $220$ in order to generate the plurality of signatures $116(m)$. In other words, the signature generation module $212$ applies a "transformation" to the messages $226(k)$ in order to obtain the signatures $116(m)$. Further discussion of the processing of the messages $226(k)$ to generate signatures may be found in relation to FIG. $3$.

In the illustrated example, the product provider $102$ is a software manufacturer that executes the signature generation module $212$ to generate the signature $116(m)$. The signature generation module $212$ utilizes a technique having a particular mathematical property to generate the signature. The signature $116(m)$ is then included as at least a part of the product ID $216(m)$ on the product $108(m)$. The product $108(m)$ in the implementation of FIG. $2$ is a computer-readable medium which is distributed to the client $104(n)$ via a product distributor $106$ and includes the application $218(m)$ for installation on the client $104(n)$ and a version of the public key, which is illustrated as public key $222(m)$. The client version of the product is illustrated as product $108(n)$, which includes the product ID $216(n)$ and the signature $116(n)$.

The signature validation module $214$ is executable to verify the signatures $116(m)$ generated by the signature generation module $212$. For example, the signature validation module $214$ may process the signature $116(m)$ using the public key $222(m)$ included in the product $108(m)$ to obtain one of two answers: (1) yes, the signature $116(m)$ is valid; or (2) no, the signature $116(m)$ is not valid. The answers are based on whether the signature $116(m)$ exhibits the particular mathematical property, further discussion of which may be found in relation to FIG. $4$. In an implementation, the public key $222$ is made public to allow other entities, which did not generate the signature, to verify the signature $116(m)$, but the private key $220$ is kept secret so that other entities cannot generate signatures having the particular mathematical property.

Continuing with the previous example, for instance, the client $104(n)$ may wish to receive an update for the application $218(n)$. In order to "prove" that the client $104(n)$ has an authorized copy of the software, the client $104(n)$ supplies the product ID $216(n)$ to the product provider $102$. The product provider $102$ may then execute the signature validation module $214$ to utilize the validation techniques to determine whether the product ID $216(n)$, and more particularly the signature $116(n)$, exhibits the particular mathematical property. If so, the product ID $216(n)$ is considered "genuine" and the client $104(n)$ is authorized to receive the update. Although validation as performed through execution of the signature validation module $214$ by the product provider $102$ has been described, validation may also be performed through execution of a signature validation module $214(n)$ on the client $104(n)$, as well as a third-party verifier as previously described.

The private key $220$ and the public key $222$ may be configured in a variety of ways to provide the generation and verification techniques. For example, these techniques may be based on isogenies, which in the following examples are configured as mappings between a plurality of elliptic curves. The generated isogenies permit use of multiple curves instead of a single curve to provide the signature. These techniques may be applied to relatively short digital signatures (e.g., typed in by a user or sent over a low-bandwidth channel), encryption (e.g., identity-based encryption (IBE) solutions, thereby allowing memorizable public keys), and so on.

For example, the public key $222$ may include a finite field, an elliptic curve, and a pairing function which may be represented as follows:

K, which is a finite field;

$E_2$, which is an elliptic curve over K; and a pairing function $e_2$ mapping a pair of points on $E_2$ to a nonzero element of K.

The private key $220$ may include the following information:

$E_1$, which is also an elliptic curve over K, isogenous to $E_2$ (perhaps the same as $E_2$)—this implies $E_1$ and $E_2$ have the same group order;

a pairing function $e_1$ mapping a pair of points on $E_1$ to a nonzero element of K; and P, Q, which are two finite points on $E_1$; and a plurality of isogenies $(\phi_1, \ldots, \phi_t)$.

Each of the plurality of isogenies $(\phi_1, \ldots, \phi_t)$ map points on the elliptic curve $E_1$ to points on the elliptic curve $E_2$. The pairing functions $e_1$ and $e_2$ in $220$ and $222$ are chosen so that if $\phi:E_1 \to E_2$ is an isogeny, then $e_2(\phi(P_1), \phi(Q_1))=e_1(\deg(\phi) (P_1, Q_1))$ for all $P_1, Q_1$, on $E_1$. The integer $\deg(\phi)$ is the degree of $\deg(\phi)$ and $\deg(\phi) P_1$ denotes elliptic curve scalar multiplication on the curve $E_1$.

To provide verification, the public key $222$ may also include result information of the application of the plurality of isogenies to Q, which may be represented as follows:

$$\phi_1(Q), \phi_2(Q), \phi_3(Q), \ldots, \phi_t(Q).$$

Each of these images is a point on $E_2$. The public key $222$ may also include the value of $e_1(P, Q)$, which is an element of the field K. Thus, the public key in this example may be utilized to verify that a signature exhibits a particular mathematical property without being able to use the public key to generate additional signatures which exhibit that mathematical property, further discussion of which may be found in relation to the following figures.

Exemplary Procedures

The following discussion describes generation and verification techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment $100$ of FIG. $1$ and the system $200$ of FIG. $2$.

FIG. $3$ is a flow diagram depicting a procedure $300$ in an exemplary implementation in which a signature is generated using an isogeny-based technique. A message "m" is received (block $302$). The message may be received in a variety of ways, such as from a random number generator, a descriptive string which specifies characteristics of a corresponding product, and so on.

The message "m" is considered by the signature generation module $212$ as a list of integers, which may be represented as follows:

$$m_1, m_2, m_3, \ldots, m_t$$

For example, the list of integers may be obtained from a random number generator as previously described, a converted alphanumeric string, and so on.

A signature "σ" is then generated from the message "m" using the private key 220 (block 304). For example, the signature "σ" may be computed utilizing isogeny techniques which include elliptic curve addition and isogeny addition using information taken from the private key 220, an example of which is shown in the following equation:

$$(\text{SIGMA}) \quad \sigma = \frac{m_1\phi_1(P) + m_2\phi_2(P) + \ldots + m_t\phi_t(P)}{deg(m_1\phi_1 + m_2\phi_2 + \ldots + m_t\phi_t)}.$$

Thus, as shown in the above equation, each integer (e.g., $m_1$, $m_2$, $m_3$, ..., $m_t$) which collectively form the message m is multiplied with the corresponding isogeny function (e.g., $\phi_1$, $\phi_2$, $\phi_3$, ..., $\phi_t$) of the private key 220. Further, the signature is a point on the elliptic curve $E_2$. In the above equation, the numerator is computed utilizing elliptic curve addition and the denominator is computed as the degree of a quantity obtained utilizing isogeny addition.

For example, as previously described, $\phi_1$, $\phi_2$, $\phi_3$, ..., $\phi_t$ are isogenies, which have a mathematical property called a degree. An isogeny multiplied by an integer is an isogeny. Additionally, when two or more isogenies between the same pair of curves are added, the result is also an isogeny. Therefore, addition of the results of $\phi_1$, $\phi_2$, $\phi_3$, ..., $\phi_t$ multiplied by the corresponding integers (e.g., $m_1$, $m_2$, $m_3$, ..., $m_t$) is an isogeny and therefore is computed using "isogeny addition". For the numerator, the multiplication of the elliptic curve points (isogenic images) $\phi_1(P)$, $\phi_2(P)$, $\phi_3(P)$, ..., $\phi_t(P)$ on $E_2$ by the corresponding integers (e.g., $m_1$, $m_2$, $m_3$, ..., $m_t$) uses elliptic curve addition. It should be noted that the signature "σ" cannot be computed without knowing the private key 220. For example, to sign a message, although the integers (e.g., $m_1$, $m_2$, $m_3$, ..., $m_t$) are known, the isogenies (e.g., $\phi_1$, $\phi_2$, $\phi_3$, ..., $\phi_t$) and their images at P are included, in this example, exclusively in the private key 220. The degree in the denominator of σ is an integer—the division is done by inverting the denominator modulo the common group order $|E|=|E_2|$.

The generated signature 116(m) and a version of the public key 222 (which is illustrated as public key 222(m)) are then incorporated on a product 108(m) (block 306), which is distributed to a client 104(n)(block 308). For example, the generated signature 116(m) may be incorporated on a computer-readable medium (e.g., a CD-ROM) which contains computer executable code, e.g., application 218(m). The generated signature 116(m) may then be utilized to verify that the computer-readable medium is authentic, further discussion of which may be found in relation to the following figure.

Figure 3:
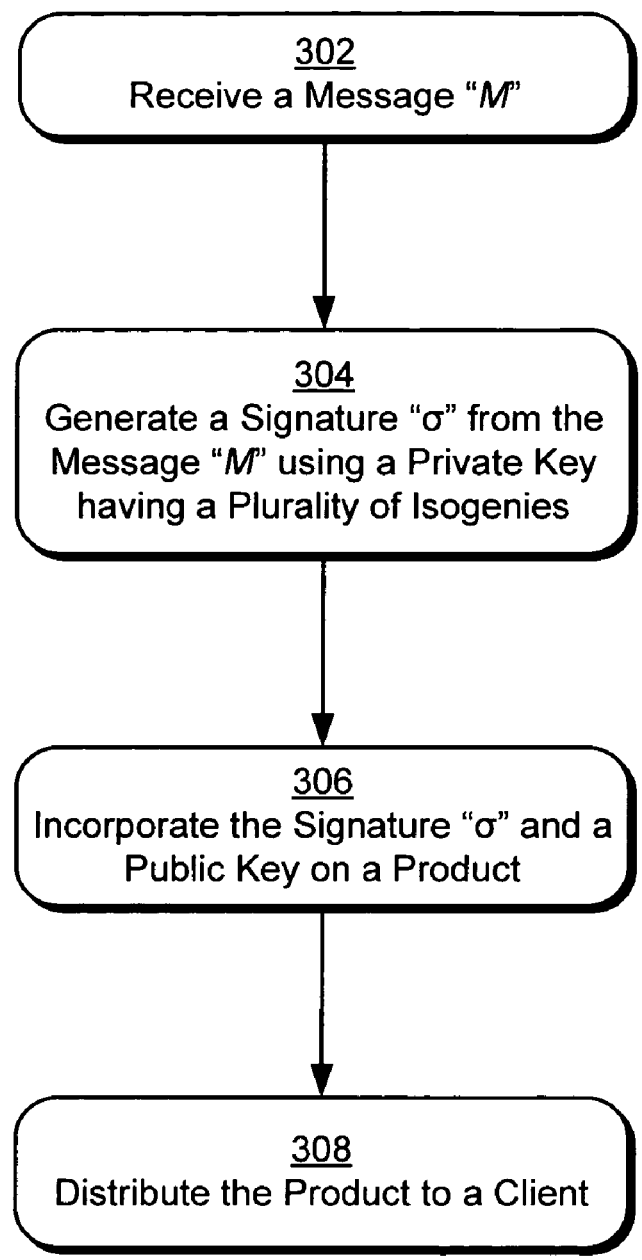
FIG. 3 is a flow diagram depicting a procedure in an exemplary implementation in which a signature is generated using an isogeny-based technique which includes a private key from FIG. 2.
Figure 4:
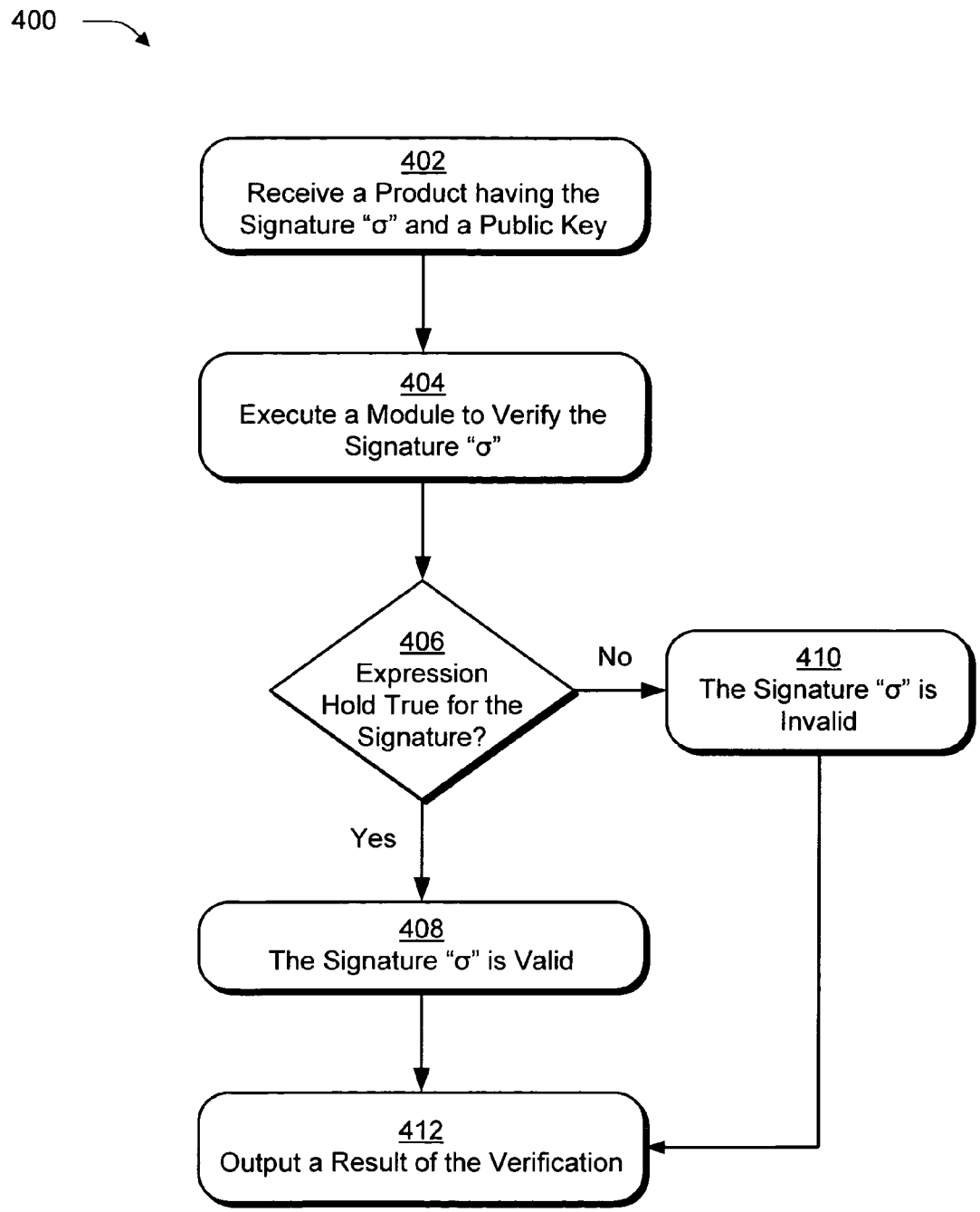
FIG. 4 is a flow diagram depicting a procedure in an exemplary implementation in which a signature generated by the procedure of FIG. 3 is verified using the public key of FIG. 2 which is also included on the product having the signature.

FIG. 4 is a flow diagram depicting a procedure 400 in an exemplary implementation in which the signature 116(m) generated by the procedure 300 of FIG. 3 is verified using the public key 222(m) of FIG. 2 which is also included on the product 108(m) having the signature 116(m). A client 104(n) receives a product (e.g., the computer-readable medium as previously described) which includes the signature "σ" and the public key 222(m)(block 402). For example, the client may purchase the computer-readable medium at a store, over the internet, and so on. The received product is then available locally to the client, which is illustrated as product 108(n), application 218(n), public key 222(n), product ID 216(n), and signature 116(n) in FIG. 2.

A module (e.g., the signature validation module 214(n)) is then executed to verify that the generated signature incorporated on the computer-readable medium is valid (block 404). For example, the signature validation module 214(n) may be included as a part of an installation module of the application 218(m). Therefore, to install the application 218(m), the installation module initiates the signature validation module 214(n) to determine whether the signature 116(m) entered by a user is valid. For instance, the signature validation module 214(n), when executed, may utilize the public key to determine whether the following expression holds true (decision block 406):

$$e_2(\sigma, m_1\phi_1(Q) + m_2\phi_2(Q) + \ldots + m_t\phi_t(Q)) = e_1(P, Q)$$

As previously described, the field element $e_1(P, Q)$ is included on the public key, as well as the images $\phi_1(Q)$, $\phi_2(Q)$, ..., $\phi_t(Q)$. If the above relationship holds true ("yes" from decision block 406), then the signature 116(m) is valid (block 408). If the above relationship is not true ("no" from decision block 406), then the signature 116(m) is invalid (block 410). A result of the validation is then output by the signature validation module (block 412), such as via a user interface, to an installation module responsible for installing the application 218(m), and so on. For instance, a result of the verification may be utilized to inform the client 104(n) that the signature is valid and therefore a software update may be obtained for a corresponding product having the signature. This verification may be performed for a variety of other reasons, further discussion of which may be found in relation to FIG. 5.

Thus, as shown in the above expression, the verification may be performed using the signature, the message, and the public key. Therefore, any client having the public key can verify whether the signature is valid, but is not able to generate new signatures without knowing the private key 220.

Let σ be a point on the elliptic curve $E_2$ as defined in equation (SIGMA). The following illustrates a proof of the verification technique:

$$e_2\left(\frac{m_1\phi_1(P) + m_2\phi_2(P) + \ldots + m_t\phi_t(P)}{deg(m_1\phi_1 + m_2\phi_2 + \ldots + m_t\phi_t)},\right.$$
$$\left. m_1\phi_1(Q) + m_2\phi_2(Q) + \ldots + m_t\phi_t(Q)\right)$$

The above expression may then be simplified as follows:

$$e_2\left(\frac{(m_1\phi_1 + m_2\phi_2 + \ldots + m_t\phi_t)(P)}{deg(m_1\phi_1 + m_2\phi_2 + \ldots + m_t\phi_t)}, (m_1\phi_1 + m_2\phi_2 + \ldots + m_t\phi_t)(Q)\right)$$

Let $\phi = m_1\phi + m_2\phi_2 + \ldots + m_t\phi$. This is an isogeny from $E_1$ to $E_2$. The above expression becomes $$e_2(\sigma, \phi(Q)) = e_2(\phi(P)/deg(\phi), \phi(Q)) = e_2(\phi(P/deg(\phi)), \phi(Q)) = e_1(P, Q)$$

using the equation and previously recited relationship as previously described for the public and private keys 220, 222. As should be apparent, $e_1(P, Q)$ is one of the expressions included in the public key 222 which was utilized to verify the signature 116(m). Thus, the signature 116(m) may be verified without using the private key.

In selecting a public key, one may choose the isogenies in such a way that distinct messages produce distinct signatures. This can be done by ensuring that nontrivial small linear combinations of the points $\phi_i(Q)$ are not zero, since such a property guarantees that the message recovery procedure described below will recover the original message given just the signature σ. The latter is in turn equivalent to the non-existence of small non-zero vectors in a suitably defined lattice. To rule out the existence of such small non-zero vectors in a given lattice one may use standard lattice basis reduction methods. The use of isogenies in the above also distinguishes the system from standard discrete log based systems in that an embodiment of the latter may yield to an discrete log attack, whereas the described system does not.

Figure 5:
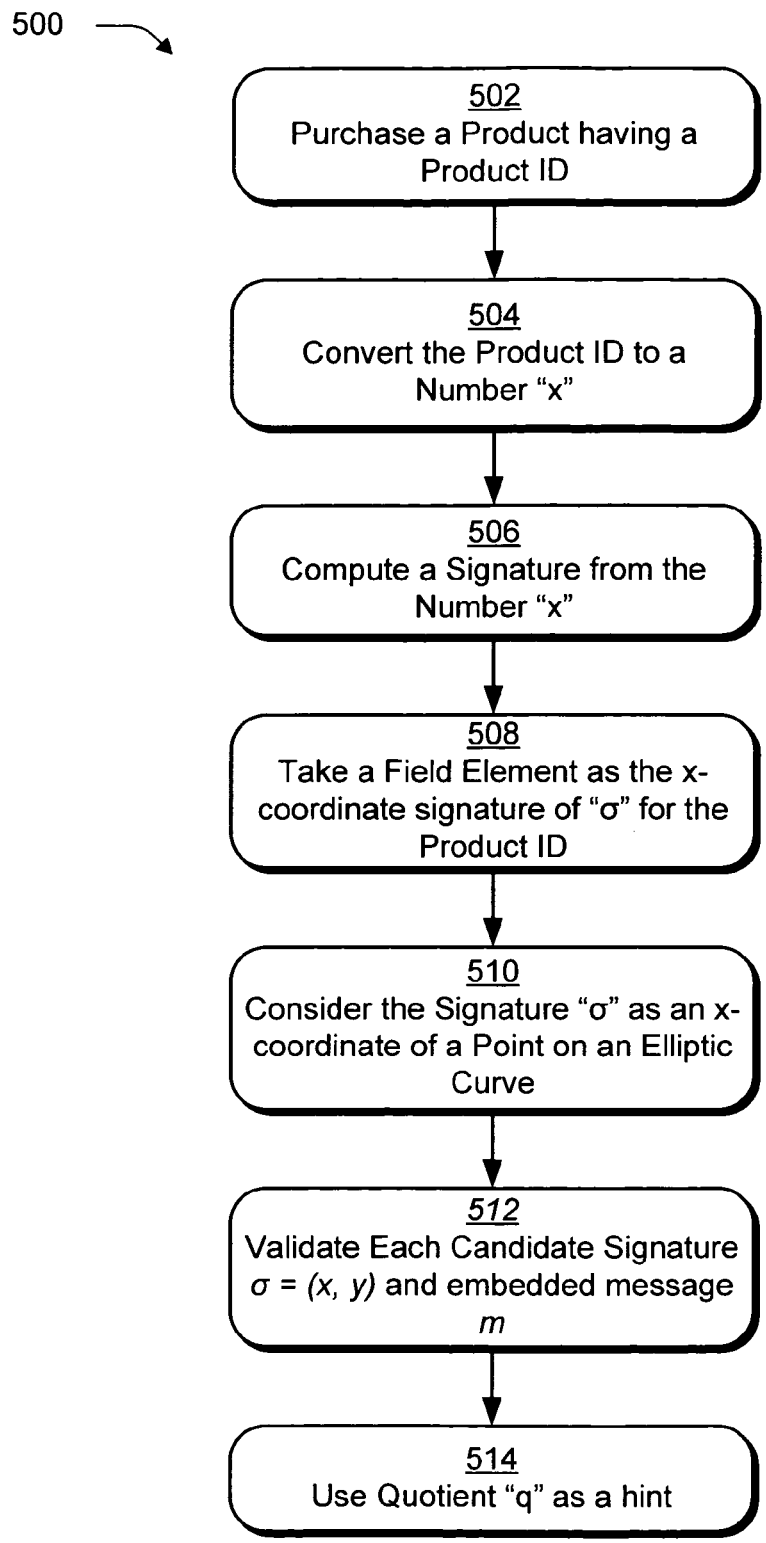
FIG. 5 is a flow diagram depicting another procedure in an exemplary implementation in which isogeny techniques are utilized to verify a signature.

FIG. 5 is a flow diagram depicting another procedure 500 in an exemplary implementation in which isogeny techniques are utilized to verify a signature. A user purchases a product having an associated product identifier (ID) that includes 25 characters (block 502). The product ID is then converted to a number "x" (block 504).

A signature is then computed from the number "x" (block 506). For example, the number "x" is then divided into two parts as follows:

$$\frac{x}{z} = q + \frac{r}{z}$$

In the above expression, $z=|K|$ is the number of elements in the finite field K. The remainder "r", which is less than $|K|$, identifies an element of K. That field element is then taken as the x-coordinate signature of "σ" for the product ID (block 508). The quotient "q" is utilized as a "hint" to locate the message.

The signature can be considered as the x-coordinate of a point on an elliptic curve (block 510), rather than the full point. For example, an elliptic curve "E" may be represented as follows:

$$E: y^2 = x^3 + ax + b$$

In the above expression, "a" and "b" are constants in the finite field K; and "x" and "y" are variables in K. A finite point on E is a pair of coordinates (x, y) that satisfies the above equation of the elliptic curve "E". If only x is known, we can solve for possible values of y, using a square root in the field K. When no square root exists, this x can be rejected.

Each candidate signature σ=(x, y) and embedded message m is then validated (block 512) by determining whether the signature has a mathematical property that is indicative of authenticity. The code uses the quotient "q" as a "hint" of where the message may be found (block 514). For example, during verification, a module (e.g., the signature validation module 214) is executed to calculate the following expression for every possible value of $(m_1, m_2, m_3, \ldots, m_t)$ until a message is found that makes the expression equal to $e_1(P, Q)$:

$$e_2(\sigma, (m_1\phi_1(Q) + \ldots + m_t\phi_t(Q)))$$

In an implementation, the signature validation module 214 may be executed to utilize "exhaustive search" in order to locate the message by taking advantage of the number of calculations that may be performed by a processor (e.g., processor 204(o)) in a relatively short amount of time. In this example, the hint "q" is also utilized to more efficiently locate the message and therefore limit the amount of "steps" (e.g., processing resources) which are utilized to compute the message. Thus, the hint "q" reduces the available search space. If an (x, y) pair and a message are found such that the expression is equal to $e_1(P, Q)$, then the signature is valid and a result is returned which indicates validity. Otherwise, if such a message is not found, the signature is deemed invalid and a result is returned which indicates invalidity as previously described in relation to FIG. 4. A variety of search techniques may be utilized for message recovery, such as baby-step-giant-step or Pollard's lambda method which are asymptotically faster than a "brute force" search method and may double the length of the messages which can be recovered, compared to brute force.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
generating, by a computing device, a signature by utilizing a plurality of isogenies included on a private key, wherein the signature is computed utilizing elliptic curve addition and isogeny addition; and
incorporating, by the computing device, the signature and a public key on a product, wherein the public key is configured to validate the signature.

2. A method as described in claim 1, wherein:
the signature and the public key are incorporated on a product; and
the signature forms at least a part of a product identifier for the product.

3. A method as described in claim 1, wherein the plurality of isogenies map points on an elliptic curve $E_1$ to points on an elliptic curve $E_2$, and the private key further includes:
the elliptic curve $E_1$; and
P, Q, which are two finite points on $E_1$.

4. A method as described in claim 1, wherein the public key includes a finite field, an elliptic curve $E_2$, a pairing function, and images of application of the plurality of isogenies, which are evaluated at a point on an elliptic curve $E_1$.

5. A method as described in claim 1, wherein the images are points on an elliptic curve $E_2$.

6. A method as described in claim 1, wherein the computation is performed using the following expression:

$$\sigma = \frac{m_1\phi_1(P) + \ldots + m_t\phi_t(P)}{deg(m_1\phi_1 + \ldots + m_t\phi_t)}$$

where "σ" is the signature, $\phi_1$ through $\phi_t$ are the isogenies in the private key, and the signature is a point on an isogenous elliptic curve $E_2$.

7. A method as described in claim 1, wherein the public key is configured to validate the signature by including a plurality of results from applying the plurality of isogenies to a point on an elliptic curve.

8. A method as described in claim 7, wherein the validation includes determining whether the following expression holds true:

$$e_2(\sigma, m_1\phi_1(Q) + \ldots + m_t\phi_t(Q)) = e_1(P, Q),$$

where $e_1$ and $e_2$ are pairing functions, P and Q are points on the elliptic curve $E_1$, and $m_1$ through $m_t$ are integers which form a message "m".

9. A method comprising:
receiving, by a computing device, a signature, wherein the signature is computed utilizing elliptic curve addition and isogeny addition; and
validating, by the computing device, the signature utilizing a public key having a plurality of results from applying a plurality of isogenies to a point on an elliptic curve.

10. A method as described in claim 9, wherein the signature and the public key are included on a product.

11. A method as described in claim 10, wherein the product is a computer-readable medium.

12. A method as described in claim 9, wherein validating includes determining whether the following expression holds true:

$$e_2(\sigma, m_1\phi_1(Q) + \ldots + m_t\phi_t(Q)) = e_1(P,Q),$$

where $e_1$ and $e_2$ are pairing functions, P and Q are points on the elliptic curve $E_1$, and $m_1$ through $m_t$ are integers which form a message "m".

13. A method as described in claim 12, wherein the message "m" is utilized to generate the signature.

14. A method as described in claim 9, wherein the signature is generated by utilizing a plurality of isogenies included on a private key.

15. A method as described in claim 14, wherein the plurality of isogenies map points on the elliptic curve $E_1$ to points on an elliptic curve $E_2$, and the private key further includes:

the elliptic curve $E_1$; and

P, Q, which are two finite points on $E_1$.

16. A method as described in claim 9, wherein the signature is generated using the following expression:

$$\sigma = \frac{m_1\phi_1(P) + \ldots + m_t\phi_t(P)}{deg(m_1\phi_1 + \ldots + m_t\phi_t)}$$

where "$\sigma$" is the signature, $\phi_1$ through $\phi_t$ are isogenies in a private key, and the signature is a point on an isogenous elliptic curve $E_2$.

17. A computer-readable medium comprising:

a signature generated by utilizing a plurality of isogenies included on a private key, the plurality of isogenies mapping points between a plurality of elliptic curves, wherein the signature is computed utilizing elliptic curve addition and isogeny addition;

a public key having a plurality of results obtained by applying a plurality of isogenies to a point on an elliptic curve; and one or more modules which are executable to validate the signature using the public key, wherein the modules are executable to validate the signature by including a plurality of results from applying the plurality of isogenies to the point on the elliptic curve.

18. A computer-readable medium as described in claim 17, further comprising at least one other module for installation and execution on a client, and wherein the one or more modules are executable to determine whether to install the at least one other module based on a result of the validation of the signature.

* * * * *